United States Patent
Loomans et al.

(10) Patent No.: US 10,467,238 B2
(45) Date of Patent: Nov. 5, 2019

(54) SEARCH PERCEIVED PERFORMANCE

(71) Applicant: Facebook, Inc., Menlo Park, CA (US)

(72) Inventors: Maykel Andreas Louisa Jozef Anna Loomans, San Francisco, CA (US); Michael Yehuda Rothschild, Sunnyvale, CA (US); Tudor M. Trufinescu, Redmond, WA (US); Nidhi Gupta, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 537 days.

(21) Appl. No.: 14/992,815

(22) Filed: Jan. 11, 2016

(65) Prior Publication Data

US 2017/0199916 A1    Jul. 13, 2017

(51) Int. Cl.
*G06F 16/20* (2019.01)
*G06F 16/248* (2019.01)

(52) U.S. Cl.
CPC ................ *G06F 16/248* (2019.01)

(58) Field of Classification Search
None
See application file for complete search history.

(56) References Cited

U.S. PATENT DOCUMENTS

| | | | |
|---|---|---|---|
| 6,389,403 B1* | 5/2002 | Dorak, Jr. | G06F 21/10 705/51 |
| 8,676,828 B1* | 3/2014 | Agarwal | G06F 17/2247 705/14.4 |
| 2006/0036567 A1* | 2/2006 | Tan | G06Q 30/08 |
| 2007/0206663 A1* | 9/2007 | Grover | G01S 19/30 375/147 |
| 2011/0061011 A1* | 3/2011 | Hoguet | G06F 3/0482 715/769 |
| 2012/0054166 A1* | 3/2012 | Jeremias | G06F 17/30265 707/706 |
| 2012/0117197 A1* | 5/2012 | Cassidy | G06F 17/301 709/219 |
| 2015/0263977 A1* | 9/2015 | Nair | H04L 47/70 709/226 |

\* cited by examiner

*Primary Examiner* — Jau Shya Meng
(74) *Attorney, Agent, or Firm* — Baker Botts L.L.P.

(57) ABSTRACT

The present disclosure provides a method including identifying an initial search result corresponding to a search query; concurrently displaying an animation for a context module comprising information associated with the initial search result and retrieving additional search results corresponding to the search query; and after the animation has completed, displaying information associated with the additional search results.

21 Claims, 8 Drawing Sheets

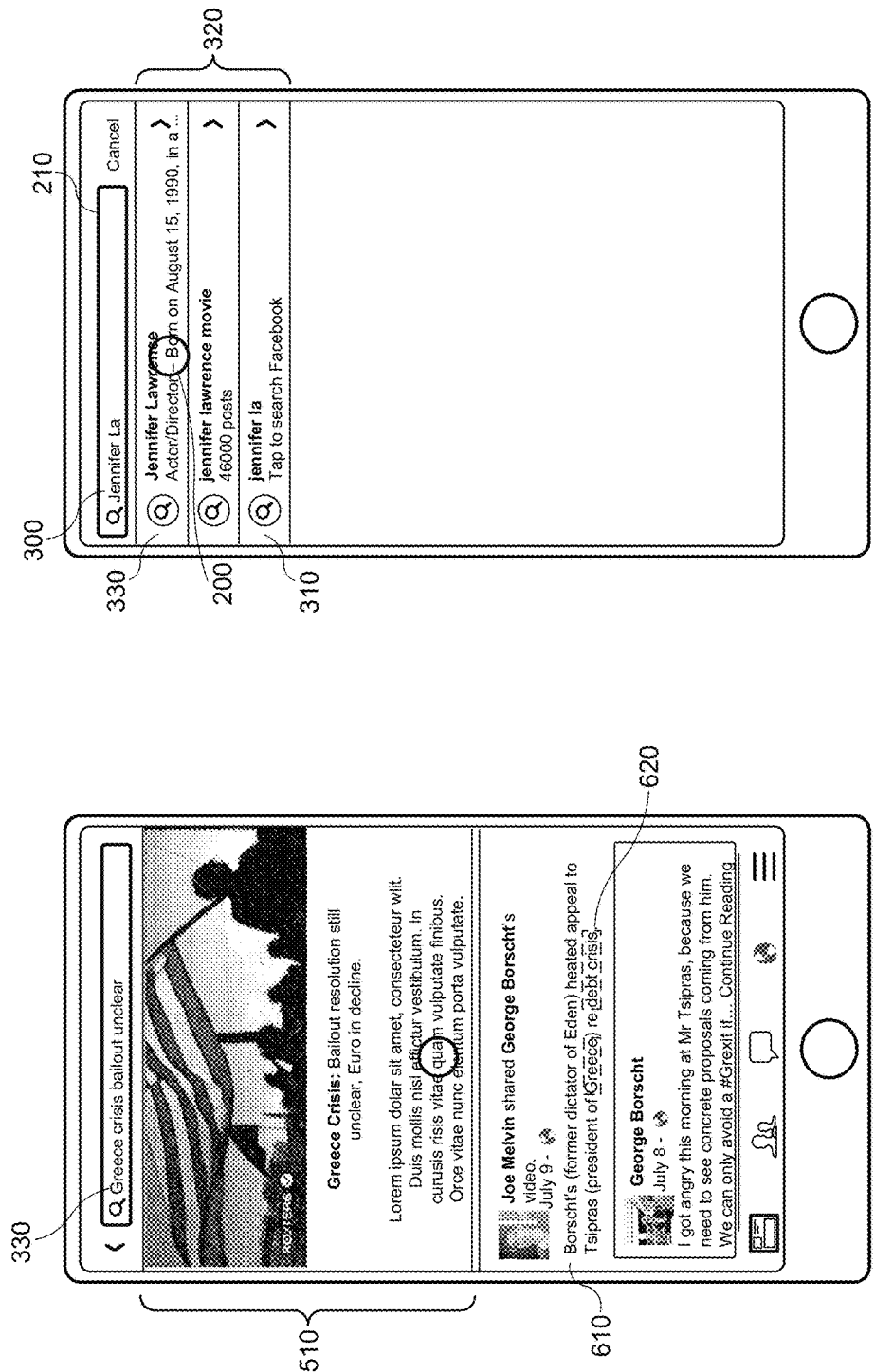

SEARCH PERCEIVED PERFORMANCE

TECHNICAL FIELD

This disclosure generally relates to online searches.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks, content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a user may enter a search query in a query field of a user interface (UI) and a typeahead feature may automatically generate a search query as the text is being entered in the query field. The query field may be populated with suggested search queries based on one or more n-grams of the entered text. The user may select one of the suggested searches and a corresponding search-results page may be rendered on a client system of the user.

In particular embodiments, the search-results page may be rendered in multiple steps. Initially, a title corresponding to the selected search query may be rendered along with a deterministic loader that shows the approximate progress of the downloading process. In particular embodiments, the typeahead process may cache a context module associated with each suggested search. The context module corresponding to the selected search may be rendered in an animated fashion on a top portion of the UI and below the title of the selected search result, while the search backend may be concurrently querying one or more search indices. Other modules may be rendered in place of the context module with content this fetched using an asynchronous search query, such as for example an official celebrity page, sports scores or game summary, or trending topics. For search queries without a corresponding context module, placeholder boxes may be rendered instead.

The selected search query may be sent to a search backend and as search results are returned in response to querying the search indices, the search results may be rendered underneath the context module. In particular embodiments, if the download time for a search result is higher than a threshold time, another deterministic loader may be rendered at the position of the search result. In particular embodiments, photos or images of the search results may be rendered independently of other content objects. The photos may initially be rendered in low-resolution and then a higher-resolution version rendered at a later time.

BRIEF DESCRIPTION OF THE DRAWINGS

FIGS. 4-6 illustrate rendering example search results on the UI.

FIG. 7 illustrates another example search query on a UI.

DESCRIPTION OF EXAMPLE EMBODIMENTS

Figure 1:
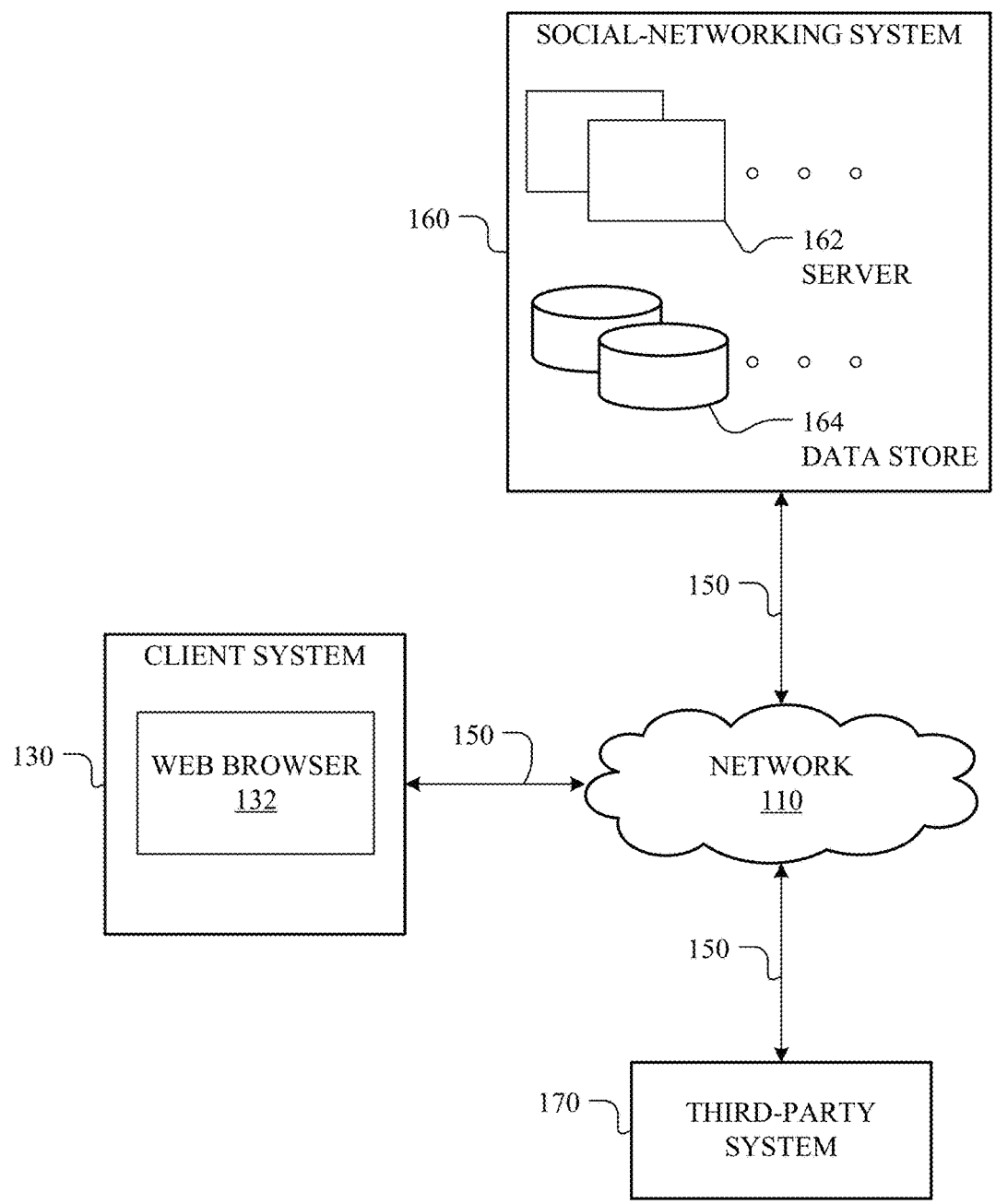
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user of client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to the server. The server may accept the HTTP request and communicate with client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server, spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, content or data objects ("objects") stored on data store 164 of social-networking system 160 may correspond to a particular node of a social graph. An edge connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of data store 164 based on newly received objects, and relationships associated with the received objects.

In particular embodiments, data store 164 may be configured to store objects of a particular object-types in a respective data storage device. As an example and not by way of limitation, an object-type may be a user, a photo, a post, a comment, a message, an event listing, a webpage, an application, a location, a user-profile page, a concept-profile page, a user group, an audio file, a video, an offer/coupon, or other suitable type of object. Although this disclosure describes particular types of objects, this disclosure contemplates any suitable types of objects. User objects stored in data store 164 may include an identifier (e.g., a character string), a user name, or a profile picture for a user of the online social network. Social-networking system 160 may also store in data store 164 information associated with a user object such as language, location, education, contact information, interests, relationship status, a list of friends/contacts, a list of family members, privacy settings, and so on. As an example and not by way of limitation, post objects may include an identifier that may be, for example, a text string for a post posted to social-networking system 160. Social-networking system 160 may also store in the post information associated with a post object such as a time stamp, an author, privacy settings, users who like the post, a count of likes, comments, a count of comments, location, and so on. As another example, a photo object (or objects of other media types such as video or audio) may include an identifier and a photo. Social-networking system 160 may also store information associated with a photo object such as a time stamp, an author, privacy settings, users who are tagged in the photo, users who like the photo, comments, and so on. In particular embodiments, data store 164 may also be configured to store information associated with each stored object.

In particular embodiments, objects stored in data store 164 may be indexed by one or more search indices and the search indices may be updated based on data (e.g., a photo and information associated with a photo) submitted to social-networking system 160 by users or other processes of social-networking system 160 (or a third-party system). The search indices may also be updated periodically (e.g., every 24 hours). Social-networking system 160 may receive a query that includes a search term, and access and retrieve search results from one or more search indices corresponding to the search term.

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes, concept nodes, edges), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Figure 3:
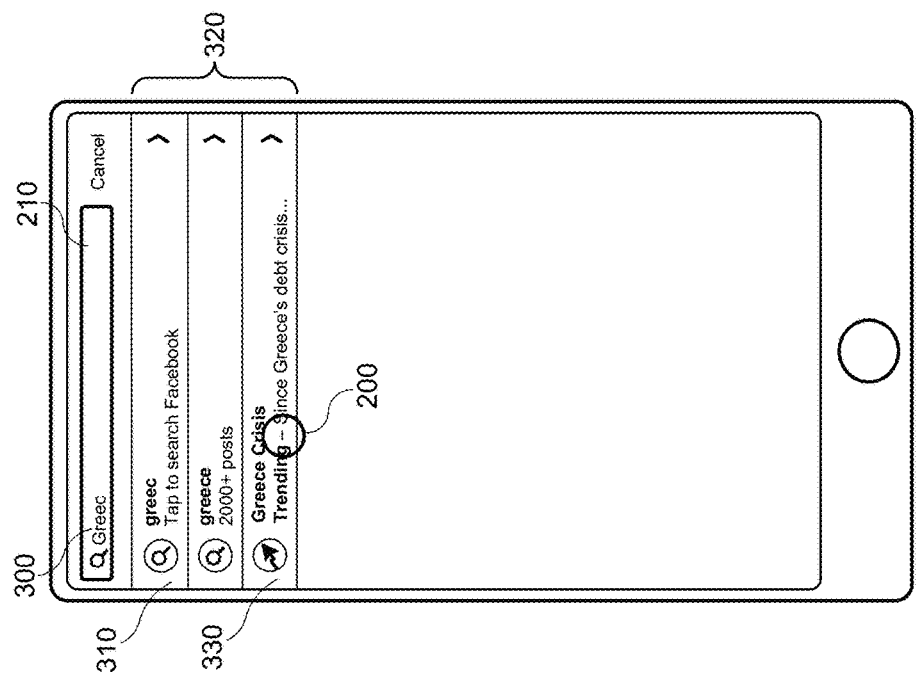
FIGS. 2-3 an example search query on a user interface (UI).
Figure 2:
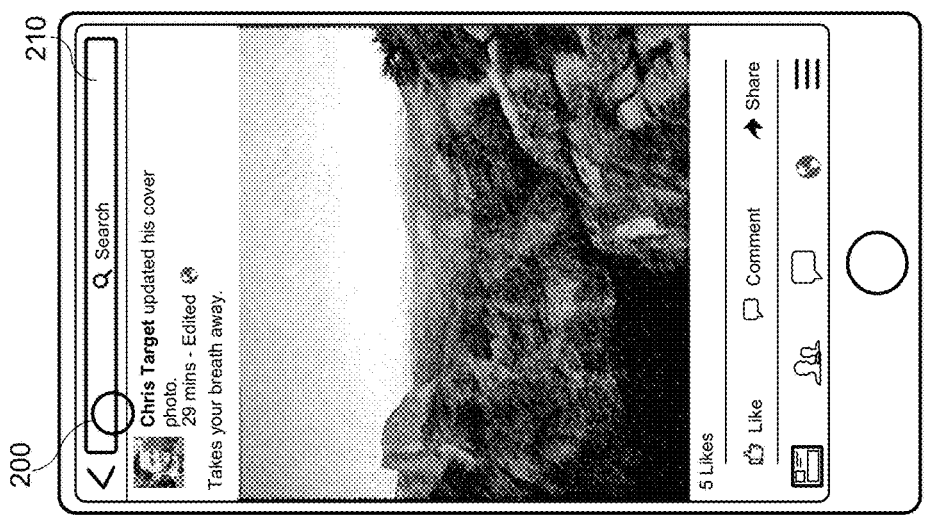

FIGS. 2-3 illustrate an example search query on a user interface (UI). As illustrated in the example of FIG. 2, a search functionality of the UI may be initiated by an input 200 (e.g., touch input or mouse selection) that selects a query field 210 of the UI. As illustrated in the example of FIG. 3, a user may enter a partial string as a text query 300 (e.g., "Greec") into query field 210 of the UI after query field 210 is selected through input 200. As the user enters this text query 200 into query field 210, social-networking system 160 may provide various suggested structured queries 310 in menu 320 (e.g., drop-down). These structured queries 310 may be presented to the user, who may then select (e.g., through input 200) among the structured queries 310 to indicate that the selected structured query 330 should be run by social-networking system 160. In particular embodiments, as each additional character of the search query is received, the initial suggested queries may be updated in menu 320. By providing suggested structured queries 310 in response to a user's text query 200, social-networking system 160 may provide a powerful way for users of the online social network to search for elements represented in the social graph based on their social-graph attributes and their relation to various social-graph elements. In particular embodiments, one or more client-side and/or backend (server-side) processes may implement and utilize a "typeahead" feature that may automatically attempt to match social-graph elements (e.g., user nodes, concept nodes, or edges) to information currently being entered by a user in an input form rendered in conjunction with a requested webpage (such as, for example, a user-profile page, a concept-profile page, a search-results webpage, or another suitable page of the online social network), which may be hosted by or accessible in social-networking system 160. The typeahead process may work in conjunction with one or more search frontend (client-side) and/or search backend (server-side) typeahead processes (hereinafter referred to simply as "typeahead process") executing at (or within) social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user or as the user enters the characters of text 300 into query field 210. As an example and not by way of limitation, the typeahead feature may automatically populate the form with a reference to stored objects (such as, for example, the node name/type, node ID, edge name/type, edge ID, or other suitable reference or identifier). In particular embodiments, the typeahead processes, in conjunction with the information from the social-graph database, as well as potentially in conjunction with various other processes, applications, or databases located within or executing within social-networking system 160, may be able to predict a user's intended declaration with a high degree of precision. More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

Figure 5:
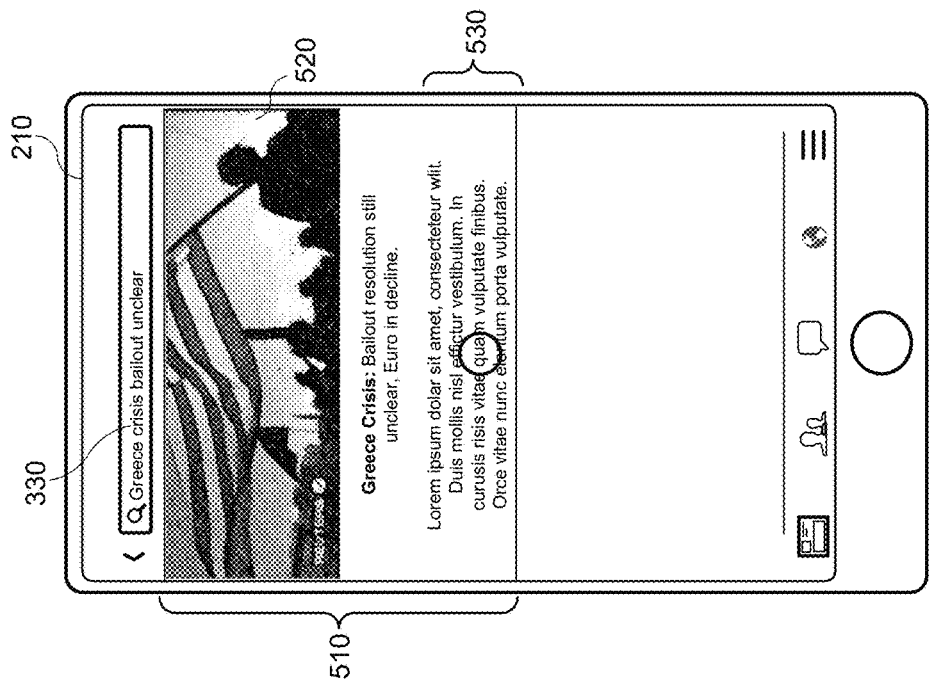
Figure 4:
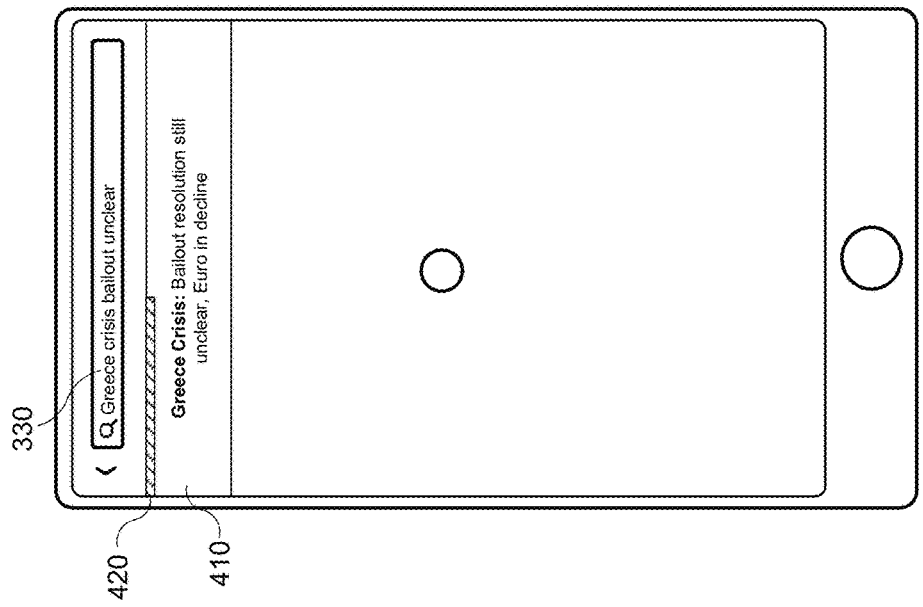

FIGS. 4-6 illustrate rendering example search results on the UI. In particular embodiments, the search-results page corresponding to the selected structured query 330 may be rendered in multiple steps. As an initial step of rendering the search-results page, a title 410 corresponding to the selected structured query 330 may be rendered along with an animation 420 (e.g., a deterministic loader or "progress bar") that indicates the approximate progress of the downloading or rendering process of the search results page, as illustrated in the example of FIG. 4. In particular embodiments, as suggested queries are being updated in menu 320 based on receiving additional text, a new animation corresponding to the updated initial search result may be initiated or animation 420 may be restarted.

In particular embodiments, the typeahead process, described above, may cache a context module 510 associated with each suggested structured query 310, as an initial search result In particular embodiments, context module 510 may include one or more objects associated with the selected structured query 330, such as for example top stories, photos, pages, or posts that match the selected structured query 330. In particular embodiments, each object of context module 510 may have an object-score higher than a pre-determined threshold score (e.g., the object is authored by a key-voice with an author-score higher than a pre-determined threshold score). Context module 510 may include title 410 and one or more objects associated with the selected structured query 330, as illustrated in the example of FIG. 5. In particular embodiments, the objects of context module 510 may be cached prior to the user initiating a search query. In this case, context module 510 may be rendered in the UI while the search backend is querying search indices of data store 164. As an example and not by way of limitation, an initial portion 520 of context module 510 may be rendered in an animated fashion on a top portion of the UI. As an example and not by way of limitation, initial portion 520 may be an object (e.g., an image), associated with the selected structured query 330, that is rendered above title 410 and additional information (e.g., another cached object) 530 may be rendered below title 410. In particular embodiments, context module 510 may be a sponsored module. Although this disclosure illustrates and describes context modules having particular objects, this disclosure contemplates any context modules having any suitable objects.

As described above, one or more of objects identified as matching selected structured query 330 may be retrieved while animation 420 and context module 510 are concurrently being rendered in the UI. As an example and not by way of limitation, social-networking system 160 may query search indices of data stores 164 to identify one or more objects stored by data store 164 that match the selected structured query 330. Social-networking system 160 may then identify objects (e.g., users, photos, profile pages (or content of profile pages), etc.) that satisfy or otherwise match the selected structured query 330. As an example and not by way of limitation, social-networking system 160 may retrieve posts corresponding to the selected structured query 330. Retrieving an identified object may include retrieving all of the objects (e.g., any text, images, identifier, or other information associated with the object), a portion of the object (e.g., a portion of text associated with the object), an object identifier (object ID) that identifies a particular social-graph element associated with the object, or any combination thereof. In particular embodiments, an additional animation (e.g., deterministic loader or progress indicator) may be rendered at the position of a search result while the additional search results are retrieved or when the download time exceeds a threshold amount of time.

As illustrated in the example of FIG. 6, a search-results page may render search results 610 below context module 510. In particular embodiments, one or more portions 620 (e.g., text) of search results 610 matching selected structured query 330 may be indicated through highlighting, outlining, or any suitable indicator. Search results 610 may correspond to an identified object that has an object score greater than a threshold object score. As an example and not by way of limitation, a search backend may generate a search-results page that includes references to any suitable number (e.g., 5, 10, or 20) of top-scoring objects that match selected structured query 330. As another example, a search-results page may include references to objects having a score in any suitable top percentile (e.g., object scores in the top 5%, 10%, 20%, or 40% of objects). In particular embodiments, references in a search-results page may be ordered according to the object scores for the respective retrieved objects. As an example and not by way of limitation, a search-results page may include references to ten top-scoring objects, and the references may be arranged in order from highest-scoring object to lowest-scoring object. Although this disclosure describes generating particular search-results pages in particular manners, this disclosure contemplates generating any suitable search-results pages in any suitable manner.

FIG. 7 illustrates another example search query on a UI. As illustrated in the example of FIG. 7, a user may enter a partial string as a text query 300 (e.g., "Jennifer La") into query field 210 of the UI. As described above, as the user enters this text query 300 into query field 210, social-networking system 160 may provide various suggested structured queries 310 in menu 320 (e.g., drop-down). These suggested structured queries 310 may be presented to the user, who may then select (e.g., through input 200) among the suggested structured queries 310 to indicate that the selected structured query 330 should be run by social-networking system 160.

Figure 9:
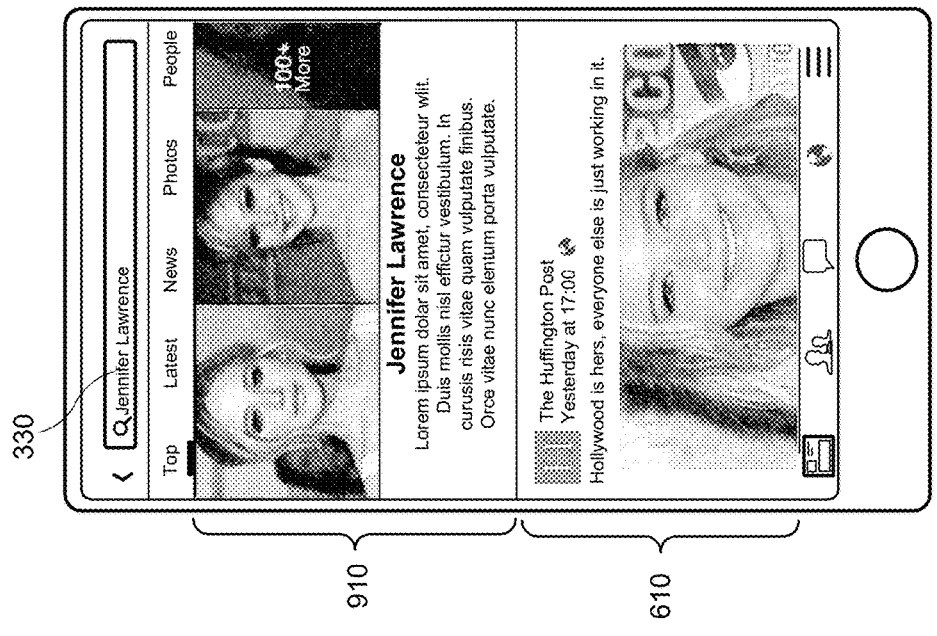
FIGS. 8-9 illustrate another example rendering of search results on the UI.
Figure 8:
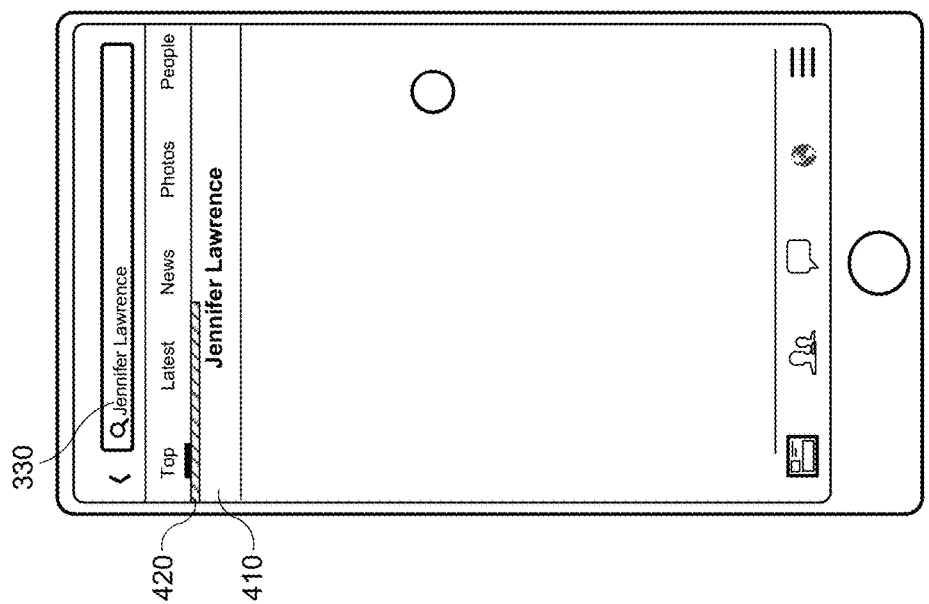

FIGS. 8-9 illustrate another example rendering of search results on the UI. As described above, the search-results page corresponding to the selected structured query 330 may be rendered in multiple steps. As an initial step of rendering the search-results page, a title 410 corresponding to the selected structured query 330 may be rendered along with an animation 420 (e.g., a deterministic loader or "progress bar") may indicate the approximate progress of the downloading or rendering process of the search results page, as illustrated in the example of FIG. 9.

In particular embodiments, an asynchronous module 910 may be rendered, in place of context module 510, with content that is not stored in data store 164 ("quick content") and fetched using an asynchronous search query or a search query that is performed independently from selected structured query 330 entered by the querying user. As an example and not by way of limitation, asynchronous module 910 may include content corresponding to an official celebrity page, sports scores, sports game summary, or trending topic, as illustrated in the example of FIG. 9. In particular embodiments, for suggested structured queries 310 that do not have a corresponding context module 510 or if there is an unsuccessful retrieval of a corresponding context module 510, one or more placeholder boxes ("shimmers") may be rendered in place of context module 510. As illustrated in the example of FIG. 9, a search-results page may render search results 610 below asynchronous module 910. In particular embodiments, high-bandwidth objects (e.g., high definition images or videos) associated with search results 610 may be initially rendered as a low-resolution version and subsequently rendered in a higher or full resolution.

Figure 10:
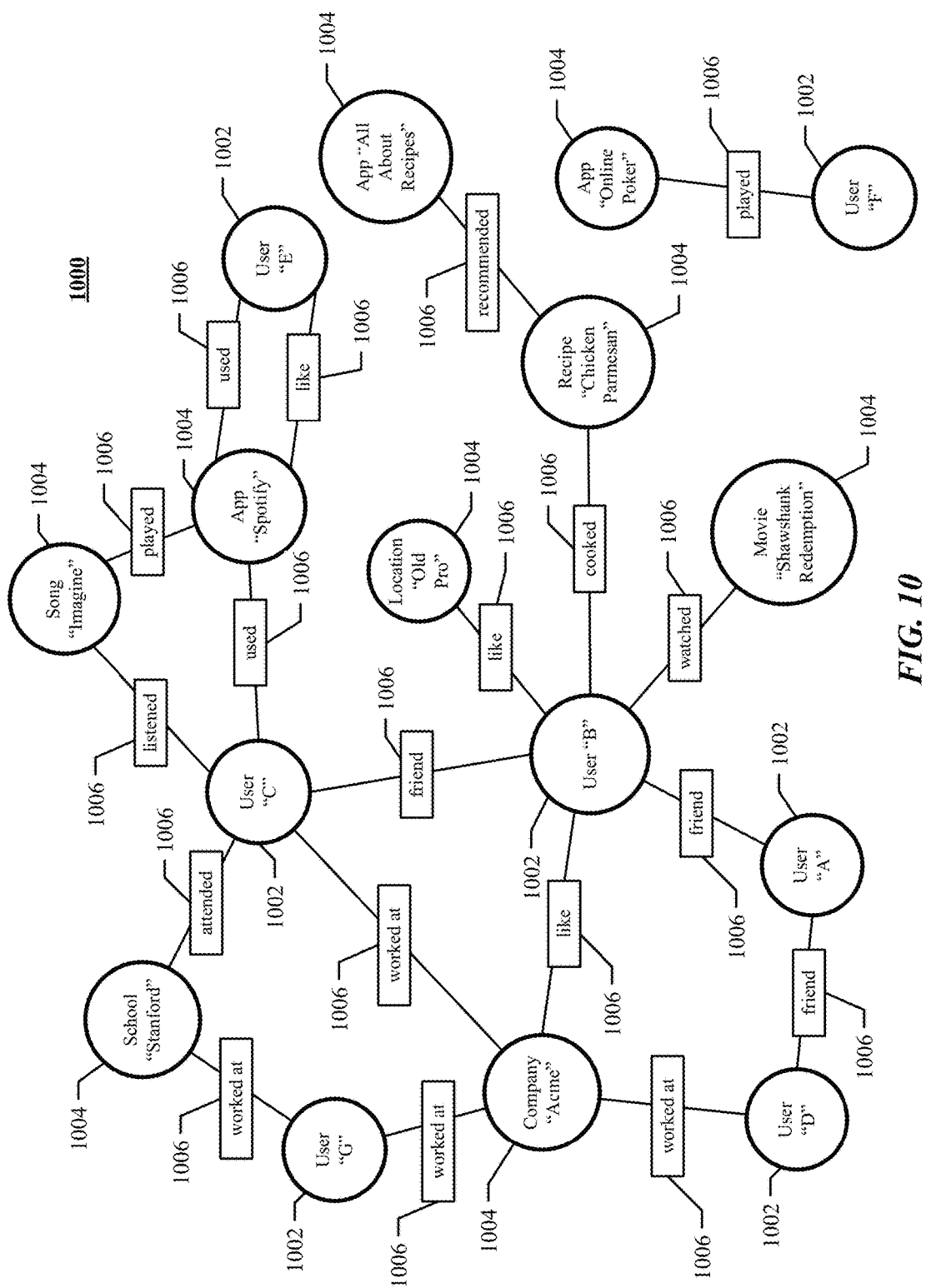
FIG. 10 illustrates an example social graph.

FIG. 10 illustrates an example social graph 1000. In particular embodiments, social-networking system 160 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, social-networking system 160, client system 130, or third-party system 170 may access social graph 1000 and related social-graph information for suitable applications. The nodes and edges of social graph 1000 may be stored as data objects, for example, in a data store (such as a social-graph database). Such a data store may include one or more searchable or queryable indexes of nodes or edges of social graph 1000.

In particular embodiments, a user node 1002 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social-networking system 160. In particular embodiments, a user node 1002 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more webpages.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1004 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 1006 connecting the first user's user node 1002 to the second user's user node 1002 in social graph 1000 and store edge 1006 as social-graph information in one or more of data stores 24. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example, a user (user "C") may listen to a particular song ("Imagine") using a particular application (SPOTIFY, which is an online music application). In this case, social-networking system 160 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 160 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social-networking system 160 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 130) may indicate that he or she likes the concept represented by the concept node 1004 by clicking or selecting a "Like" icon, which may cause the user's client system 130 to send to social-networking system 160 a message indicating the user's liking of the concept associated with the concept-profile page. In response to the message, social-networking system 160 may create an edge 1006 between user node 1002 associated with the user and concept node 1004, as illustrated by "like" edge 1006 between the user and concept node 1004. In particular embodiments, social-networking system 160 may store an edge 1006 in one or more data stores. In particular embodiments, an edge 1006 may be automatically formed by social-networking system 160 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

Figure 11:
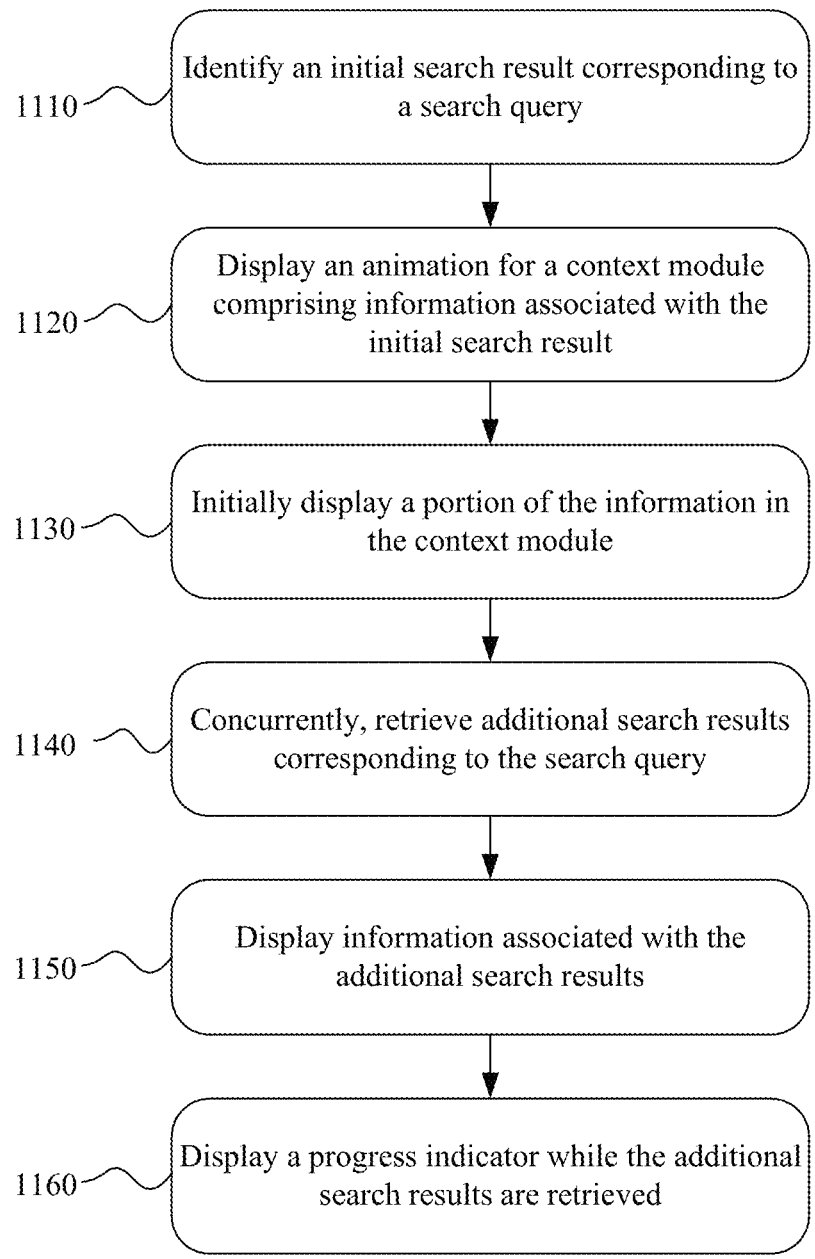
FIG. 11 illustrates an example method for rendering search results on a UI.

FIG. 11 illustrates an example method 1100 for rendering search results on a UI. The method may begin at step 1110, where social-networking system 160 may identify an initial search result corresponding to a search query. In particular embodiments, each post is associated with one or more topics of a number of topics of social networking system 160. At step 1120, computing devices of social-networking system 160 may display an animation for a context module comprising information associated with the initial search result. At step 1130, displaying the animation includes social-networking system 160 initially displaying a portion of the information in the context module and expanding to display additional information in the context module. At step 1140, computing devices of social-networking system 160 may retrieve additional search results corresponding to the search query concurrently with step 1120. In particular embodiments, the news-event object includes a seed post from the first set of posts and a tagging-algorithm for identifying posts matching the trending topic. Furthermore, each search result may include a reference to an identified post that matches the trending topic. At step 1150, computing devices of social-networking system 160 may, after the animation has completed, display information associated with the additional search results. At step 1160, a progress indicator may be displayed while the additional search results are retrieved. Particular embodiments may repeat one or more steps of method 1100 of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for rendering search results on a UI, including the particular steps of the method of FIG. 11, this disclosure contemplates any suitable method for rendering search results on a UI including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 1000, social-networking system 160 may analyze the number and/or type of edges 1106 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 12:
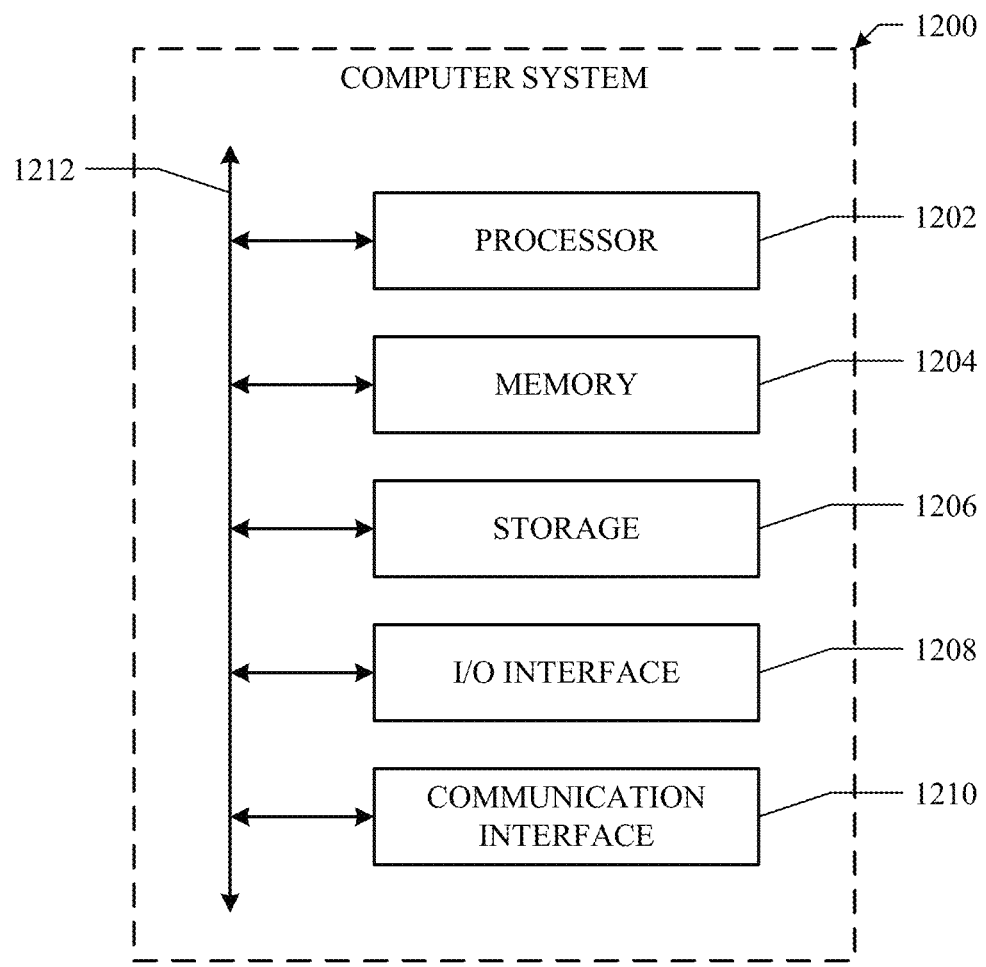
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 12000. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a client computing device, receiving a search query;
by the client computing device, retrieving, from a remote search backend, an initial search result corresponding to the search query;
by the client computing device, storing the initial search result in association with the search query in a local cache of the client computing device;
by the client computing device, rendering a search results page comprising a context module and a search results module, wherein the search results module is initially empty;
by the client computing device, concurrently:
displaying an animation indicating a progress of retrieving information for the search results page;
displaying the initial search result in the context module, the initial search result being accessed from the local cache; and
retrieving, from the remote search backend, additional search results corresponding to the search query, the additional search results being stored in a data store of the remote search backend; and
by the client computing device, after the animation has progressed, populating the search results module with the additional search results.

2. The method of claim 1, wherein displaying the initial search result in the context module comprises:
initially displaying a first portion of the initial search result in the context module; and
expanding to display additional portions of the initial search result in the context module.

3. The method of claim 1, further comprising, after the displaying of the animation is completed, displaying a progress indicator while the additional search results are retrieved.

4. The method of claim 1, wherein each of the additional search results are retrieved serially, and wherein the method further comprises displaying a respective progress indicator for each of the additional search results as it is retrieved.

5. The method of claim 4, wherein each respective progress indicator provides an indication of a period of time estimated for retrieving the respective additional search result.

6. The method of claim 1, wherein search results corresponding to the search query are retrieved by a typeahead process, wherein as each additional character of the search query is received at the client computing device, the initial search result is updated and a new animation corresponding to the updated initial search result is initiated.

7. The method of claim 6, further comprising displaying one or more suggested search queries in response to the typeahead process.

8. The method of claim 7, wherein the suggested search queries are rendered in a drop-down menu of a user interface (UI) of the client computing device.

9. The method of claim 7, wherein:
each suggested search query is associated with a respective initial search result; and
each suggested search query is stored with the respective initial search result in the local cache of the client computing device.

10. The method of claim 1, wherein the initial search result comprises information from a third-party system or a trending topic of a social-networking system.

11. The method of claim 1, wherein the initial search result comprises a title.

12. The method of claim 1, wherein retrieving the additional search results comprises rendering one or more images of the additional search results separately from a remainder of the additional search results.

13. The method of claim 12, further comprising:
initially rendering the images in a low-resolution; and
subsequently rendering the images in a high-resolution.

14. The method of claim 1, wherein:
one or more placeholder graphical elements are assigned as the initial search result in response to an unsuccessful retrieval of the initial search result from the cache; and
the displaying of the initial search result in the context module comprises displaying the one or more placeholder graphical elements in the context module.

15. One or more computer-readable non-transitory storage media embodying software that is operable when executed by a processor to:
receive a search query;
retrieve, from a remote search backend, an initial search result corresponding to the search query;

store the initial search result in association with the search query in a local cache of a client computing device comprising the processor;
render a search results page comprising a context module and a search results module, wherein the search results module is initially empty;
concurrently:
  display an animation indicating a progress of retrieving information for the search results page;
  display the initial search result in the context module, the initial search result being accessed from the local cache; and
  retrieve, from the remote search backend, additional search results corresponding to the search query, the additional search results being stored in a data store of the remote search backend; and
after the animation has progressed, populate the search results module with the additional search results.

16. The one or more computer-readable non-transitory storage media of claim 15, wherein the software is further configured to:
  initially display a first portion of the initial search result in the context module; and
  expand to display additional portions of the initial search result in the context module.

17. The one or more computer-readable non-transitory storage media of claim 15, wherein the software is further configured to, after the displaying of the animation is completed, display a progress indicator while the additional search results are retrieved.

18. The one or more computer-readable non-transitory storage media of claim 15, wherein each of the additional search results are retrieved serially, and wherein a respective progress indicator is displayed for each of the additional search results as it is retrieved.

19. A computing device comprising: a processor; and a memory coupled to the processor comprising instructions executable by the processor, wherein the instructions are executed by the processor to:
  receive a search query;
  retrieve, from a remote search backend, an initial search result corresponding to a search query;
  store the initial search result in association with the search query in a local cache of the computing device;
  render a search results page comprising a context module and a search results module, wherein the search results module is initially empty;
  concurrently:
    display an animation indicating a progress of retrieving information for the search results page;
    display the initial search result in the context module, the initial search result being accessed from the local cache; and
    retrieve, from the remote search backend, additional search results corresponding to the search query, the additional search results being stored in a data store of the remote search backend; and
  after the animation has progressed, populate the search results module with the additional search results.

20. The computing device of claim 19, wherein the instructions are further configured to:
  initially display a first portion of the initial search result in the context module; and
  expand to display additional portions of the initial search result in the context module.

21. The computing device of claim 19, wherein the software is further configured to, after the displaying of the animation is completed, display a progress indicator while the additional search results are retrieved.

* * * * *